Feb. 9, 1932.  D. J. STEWART ET AL  1,844,449
TRANSMITTER
Filed July 30, 1928  4 Sheets-Sheet 1

INVENTOR
Duncan J. Stewart
George Forrest Drake
ATTORNEYS

Feb. 9, 1932.  D. J. STEWART ET AL  1,844,449
TRANSMITTER
Filed July 30, 1928    4 Sheets-Sheet 2

INVENTOR
Duncan J. Stewart
George Forrest Drake
By Chindahl, Parker & Carlson
ATTORNEYS Feb. 9, 1932.  D. J. STEWART ET AL  1,844,449

TRANSMITTER

Filed July 30, 1928 4 Sheets-Sheet 3

INVENTOR
Duncan J. Stewart
George Forrest Drake
ATTORNEYS

Feb. 9, 1932.  D. J. STEWART ET AL  1,844,449
TRANSMITTER
Filed July 30, 1928   4 Sheets-Sheet 4

INVENTOR
Duncan J. Stewart
George Forrest Drake
By
ATTORNEYS

Patented Feb. 9, 1932

1,844,449

UNITED STATES PATENT OFFICE

DUNCAN J. STEWART AND GEORGE FORREST DRAKE, OF ROCKFORD, ILLINOIS, ASSIGNORS TO HOWARD D. COLMAN, OF ROCKFORD, ILLINOIS

TRANSMITTER

Application filed July 30, 1928. Serial No. 296,300.

The invention relates to a device for transmitting a predetermined signal combination for the purpose of controlling a desired mechanism or instrumentality at a more or less remote point; and the object of the invention generally stated is to provide an actuating means for the transmitter which is manually operable but which is incapable of being manipulated in such a way as to interfere with the signal cycle, or render the device inoperative.

A more specific object is to provide an actuating means for the transmitter including a driving spring, with manually operable winding means for automatically placing a predetermined maximum tension on the spring preliminary to each signal sending cycle.

A further object is to provide a spring winding means for a spring-actuated signal transmitter, which is inoperative during the signal sending cycle.

Another object is to provide a trip mechanism for initiating each signal cycle of a signal transmitter and automatically terminating the same with the driving spring under a predetermined initial tension, in combination with a spring winding means adapted to actuate the trip mechanism so as to initiate the cycle only after the spring has been tensioned to a predetermined maximum.

Still another object is to provide a signal sending device of the character referred to which is simple in construction, durable and certain in operation.

The objects of the invention thus set forth, together with other and ancillary advantages are attained by the construction and arrangement illustrated in the accompanying drawings forming a part hereof and hereinafter described. While only one embodiment of the invention is set forth, it is contemplated that various changes in the construction and arrangement employed may be made by those skilled in the art without departing from the spirit and scope of the invention as expressed in the appended claims.

Figure 1 of the drawings is a side elevational view of a sender constructed in accordance with our invention and having an enclosing casing shown in section.

Figure 1:
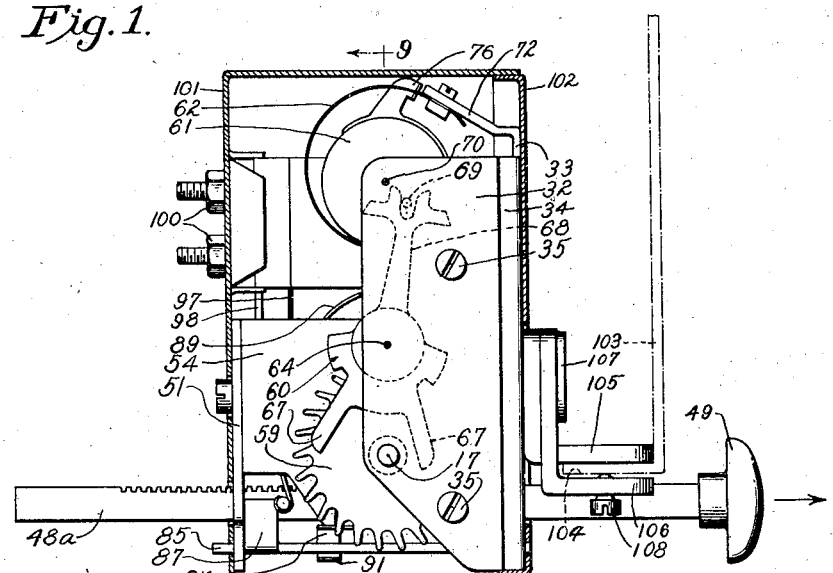

The transmitting mechanism illustrated in the drawings is particularly adapted for use in combination with the selective receiving apparatus disclosed in Patent No. 1,760,379, issued on May 27, 1930, to Duncan J. Stewart. Accordingly the invention will be described as a means for transmitting radiant energy fields in a preconcerted codal combination, from a motor vehicle or the like, for the purpose of controlling, through the medium of such a receiving apparatus, the operation of a garage door or other selected instrumentality.

Figure 15:
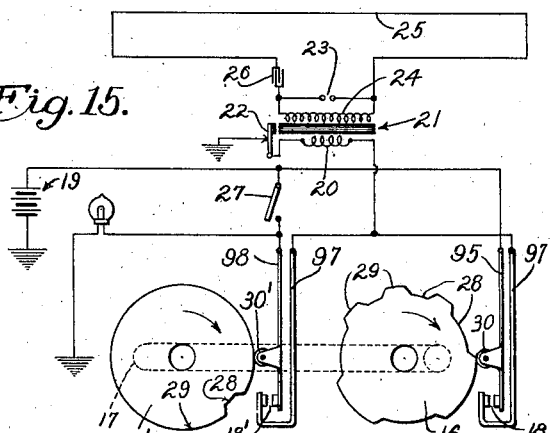
Fig. 15 is a schematic view showing the wiring diagram.

In the form herein illustrated, the transmitting mechanism comprises two disks 16 and 16' (Figs. 2 and 15) fixed upon a rotatable shaft 17 and operating to close two sets of switch contacts 18 and 18' respectively. The switch contacts 18 are interposed in a circuit including a battery 19 (which may be the storage battery of a motor vehicle) and the primary 20 of an induction coil 21, the later having the usual vibrator 22. A spark gap 23 is interposed in parallel with the secondary 24 of the coil 21, this latter circuit being in series with a closed or loop antenna 25 and a condenser 26 forming an oscillatory circuit. The loop antenna may be suitably mounted beneath the motor vehicle. The contacts constituting the switch 18' are interposed in a shunt circuit including a part of the lighting circuit of the motor vehicle such, for example, as the tail light circuit, the latter having therein the usual hand operated switch 27.

The disks 16 and 16' constitute rotary sending elements, and are constructed to provide peripheral depressions 28 and elevations 29. These elevations and depressions determine the spacing of the units of the codal signal, the movable contacts of the switches being respectively equipped with followers 30, 30' adapted to engage with the peripheries of the disks 16, 16' respectively so as to open the switch contacts when an elevation is encountered. It will be apparent that in each revolution of the disk, the two sets of switch contacts are operated, the former operating intermittently at predetermined intervals and the later once in each cycle but at a predetermined point therein. The operation of the switch contacts 18', however, is effective to energize the induction coil 21 only when the hand operated switch 27 controlling the light circuit is closed.

Figure 9:
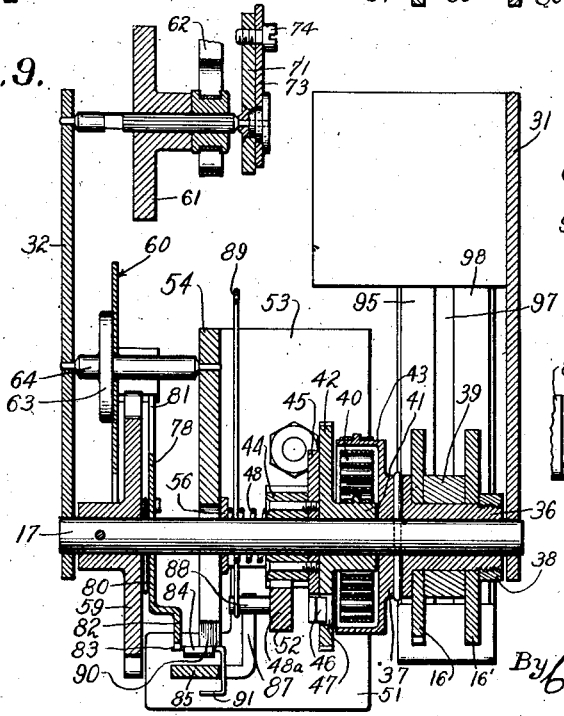
Fig. 9 is a fragmentary transverse sectional view taken approximately in the plane of line 9—9 of Fig. 1, but on a larger scale.

The disks 16, 16' are arranged to be rotated, by power applied to the shaft 17, through one complete revolution for each signal cycle. Said shaft (Figs. 2, 3, 4 and 9) is journaled at its opposite ends in the side plates 31 and 32 of a U-shaped frame including also a front plate 33. The plate 32 as shown clearly in Fig. 4 is separately formed for purposes of assembling and disassembling the parts, the side and front plates 31 and 33 being formed in a U-shaped member having a leg 34 (Fig. 4) opposite the side plate 31 to which the plate 32 is removably secured by means of bolts 35. As shown in Fig. 9, the disks 16 and 16' are secured near one end of the shaft 17 within the frame, mounted upon a sleeve 36 having a hub portion 37 pinned to the shaft, the disks being clamped on the sleeve by means of a nut 38 with a spacing collar 39 therebetween.

Figure 10:
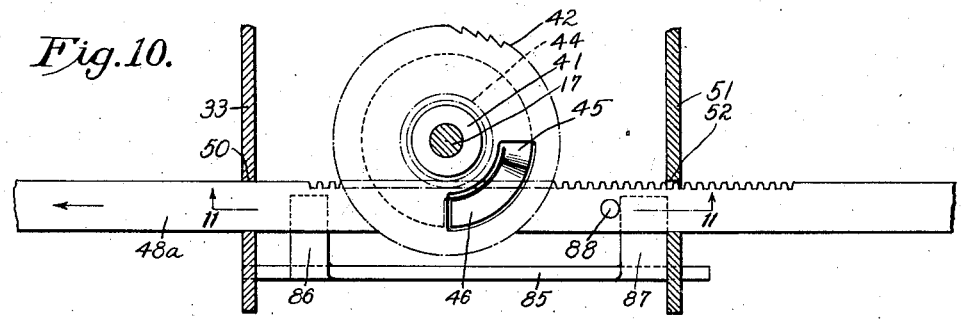
Fig. 10 is a fragmentary vertical sectional view showing a part of the spring winding means and a part of the trip mechanism actuated by said means to initiate the signal cycle, the parts being shown in their normal or initial position.
Figure 11:
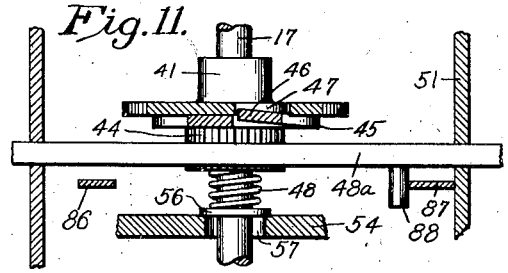
Fig. 11 is a fragmentary sectional view taken approximately on the line 11—11 of Fig. 10.
Figure 13:
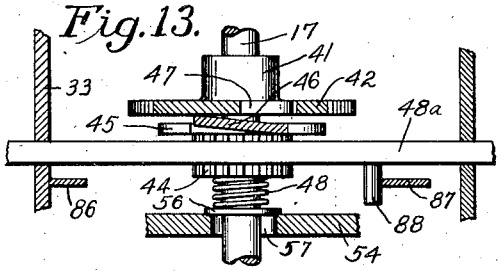
Fig. 13 is a section view taken approximately in the plane of line 13—13 of Fig. 12.
Figure 12:
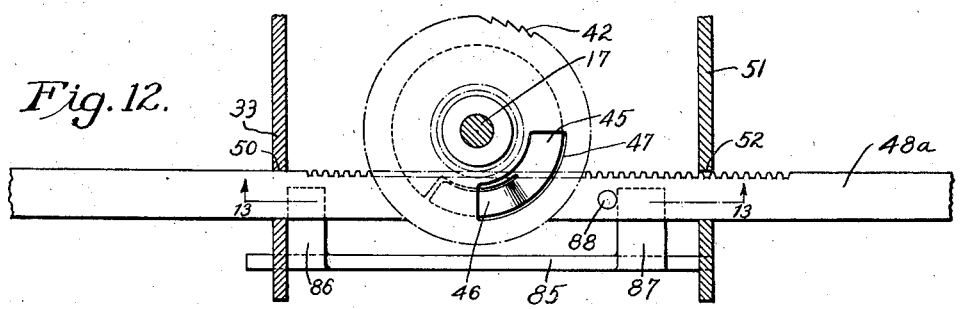
Fig. 12 is a view similar to Fig. 10, but showing the relation of the parts after the initiation of a signal cycle, with the spring winding means ineffective during that cycle.

In the present embodiment the means for driving the shaft, and hence the disks 16, 16', comprises a spirally coiled spring 40 (Fig. 9) which is adapted to be tensioned preliminary to each operating cycle through a one-way connection with a suitable hand operator. The inner end of the spring is anchored to the hub 41 of a ratchet wheel 42, and the other end of the spring is anchored to the peripheral wall of a hollow drum 43 formed integral with the hub 37 of the sleeve 36 which carries the sending disks 16 and 16'. Loose on the shaft 17 is a spur pinion 44 having rigidly secured thereto a disk 45 formed with a single ratchet tooth 46 (Figs. 10 to 13) which is adapted to engage a shoulder formed by one edge of a slot 47 in the ratchet disk 45. A coiled expansion spring 48 acts upon the pinion 44 to press the disk 45 yieldably toward the ratchet wheel 42. In the normal relation of the parts, that is when the transmitter is idle, the tooth 46 is adapted to enter the slot 47 (Figs. 10 and 11), and it will be seen therefore that when the pinion 44 is rotated in a clockwise direction as viewed in Fig. 10 the ratchet wheel 42 will be rotated, and with it the inner end of the spring 40 to place the same under tension, the drum 43 being meanwhile held stationary by means to be later described.

The hand operator for rotating the pinion comprises, in the preferred embodiment, a rack bar 48ª (Figs. 4, 5 and 10) slidably mounted for reciprocation in the frame and having at its forward end a knob or button 49. For guiding the rack bar the front plate 33 of the frame has a slot 50 (Fig. 12), and a stationary plate 51 rearwardly of the frame has a similar slot 52. Said plate 51 is bolted to a transversely disposed flange 53 (Fig. 2) at the rear end of an intermediate frame member or plate 54 spaced laterally from the side plate 32 and having at its forward end a flange 55 suitably secured to the front plate 33 of the frame as by spotwelding. The spring 48 which yieldably urges the toothed disk 45 against the ratchet wheel 42, bears against this frame plate 54 through the medium of a washer 56, the plate 54 being slotted as at 57 to permit the shaft 17 to pass therethrough.

Coacting with the ratchet wheel 42 is a detent pawl 58 (Fig. 5) for preventing reverse rotation thereof, said detent pawl being in the form of a leaf spring suitably secured to the front plate 33 of the frame as by spotwelding. By this construction a forward pull on the rack bar 48ª operates through the pinion 44, toothed disk 45 and ratchet wheel 42, which serves to place the spring 40 under tension. As herein shown the diameter of the pinion is such that in one complete revolution thereof the driving spring is placed under the desired maximum tension preliminary to the initiation of the signal cycle.

The means for initiating and terminating the signal cycle is operatively associated with an escapement mechanism provided for the purpose of controlling the speed of rotation of the signal control disks 16 and 16'. This escapement mechanism is of a construction which is, in all substantial respects, similar to that set forth and claimed in the copending application of Howard D. Colman, Serial No. 175,377, filed March 14, 1927. Briefly it comprises a toothed escapement wheel 59 (Figs. 6 to 8) fast on the shaft 17 and an oscillatory pallet 60 operatively associated with a balance wheel 61 controlled by a coiled balance spring 62. Herein the pallet is rigid with a disk 63 formed integral with a pin 64 which is journaled at opposite ends in the side plate 32 and the intermediate frame plate 54.

The pallet has a pair of arcuate dogs 65 and 66 adapted to engage alternately with the teeth of the escapement wheel to effect a rapid step-by-step movement of the shaft 17 during each signalling cycle. Rigid with respect to the pallet are a pair of spaced fingers 67 straddling the hub of the escapement wheel so as to serve as stops limiting the swing of the pallet in either direction. An arm 68 extends upwardly from the pallet and is forked at its end to receive a pin 69 on the balance wheel 61. Herein said wheel is rigid with a pin 70 journaled at one end in the upper end of the side plate 32 and at the other end in a frame member 71 integral with and turned rearwardly from the front plate 33. One end of the balance spring is anchored to the wheel 61 and the other end to an arm 72 formed integral with the front plate 33 (Fig. 1) and extending upwardly and rearwardly.

Means is provided for varying the period of oscillation of the balance wheel 61 and thus regulating the speed of the shaft 17, this means consisting of a segmental plate 73 (Fig. 5) pivoted on the axis of the balance wheel 61 and adapted to be clamped against the member 71 by a screw 74 extending through an elongated arcuate slot 75 in the plate 73. The latter has an arm 76 slotted at 77 to receive snugly the outer loop of the balance spring 62 so that the effective length of the spring will be determined by the angular position of said arm.

The escapement mechanism operates to effect a step-by-step movement of the shaft 17 and hence of the sending disks 16, 16', and the teeth of the latter are coordinated with the step-by-step motion to effect an accurate timing of the signal impulses which are transmitted during each revolution of the disks. Thus the arrangement is such that the switch contacts are closed to initiate the transmission of an impulse upon one advancing movement of the escapement wheel, and are opened to terminate the impulse upon a subsequent advancing movement. For a further description of this feature of the device, reference is made to the said copending application of Howard D. Colman Serial No. 175,377.

Figure 6:
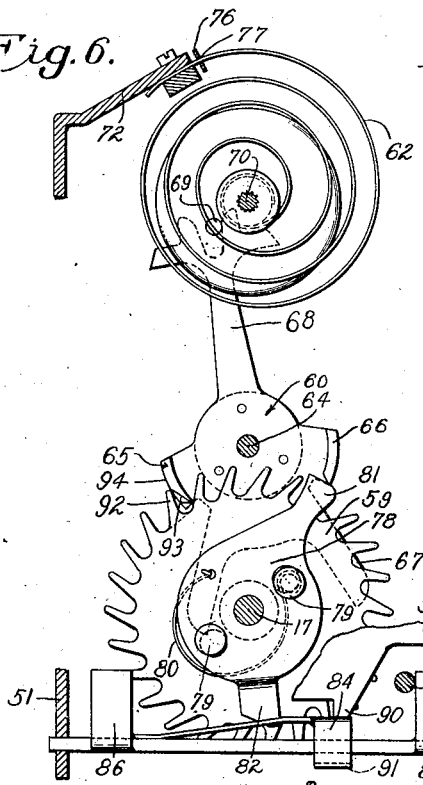
Figs. 6, 7 and 8 are fragmentary sectional views illustrating an escapement mechanism for controlling the rotative speed of the device, with means associated therewith for controlling the starting and stopping of the device at the beginning and end of the signal cycle.
Figure 7:
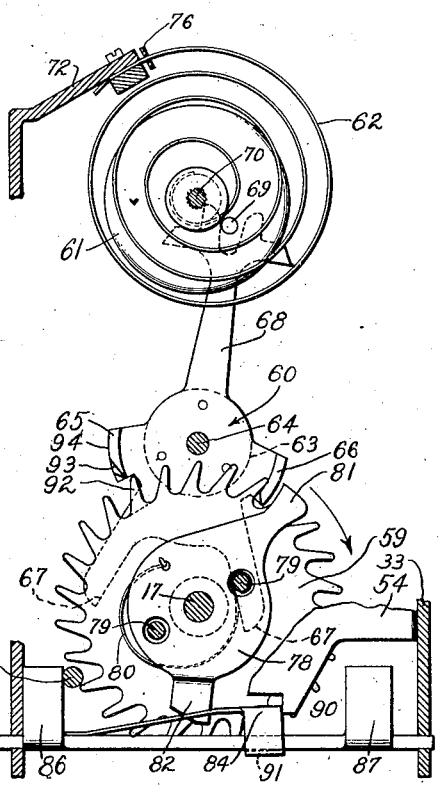
Figure 8:
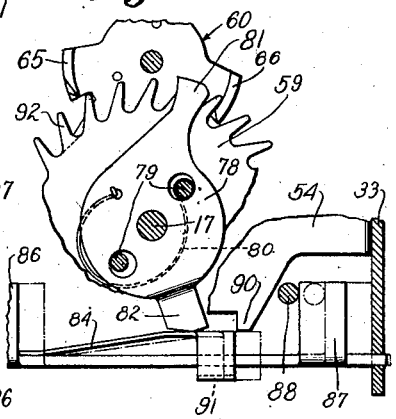

The means associated with the escapement mechanism for initiating and terminating each operating cycle comprises a control disk 78 (Figs. 6 to 8) loose on the shaft 17 and having a pin-and-slot connection with the escapement wheel 59. This pin-and-slot connection comprises a pair of headed studs 79 to one of which is anchored a spring 80 having its opposite end anchored to the control disk 78. The spring tends to swing the arm in a direction opposite the direction of rotation of the shaft 17, as permitted by enlarged holes through which the studs pass (Fig. 7). Integral with the control disk 78 is an arm 81 which is arranged to coact with the pallet dog 66 so as to maintain the other dog 65 in holding engagement with a tooth of the escapement wheel, thereby preventing rotation of the escapement wheel by the spring. The disk 78 also carries a depending lug 82 offset from the plane of the disk (Fig. 9), and, in the initial or stopped position of the mechanism, engaging in a notch 83 (Fig. 4) in a reciprocable trip member 84. It will be seen that with the parts in the position shown in Fig. 6, movement of the trip member 84 to the left operates to move the disk 78 independently of the escapement wheel and disengage the arm 81 from the pallet dog 66, thus releasing the escapement mechanism for operation; and that at the end of one revolution of the escapement wheel, the arm 81 is moved thereby into engagement with the pallet dog 66 to terminate the cycle.

The trip member 84 is a part of a trip mechanism arranged to be actuated to release the escapement mechanism. This mechanism is operable only at the end of the spring winding operation, in order to insure that the driving spring shall be placed under its predetermined maximum tension preliminary to each operating cycle. To this end the trip member 84 is secured to a bar 85, the opposite ends of which are respectively slidable in the front plate 33 and the rear plate 51. On said bar are a pair of upstanding lugs 86 and 87 disposed in the path of movement of a pin 88 projecting laterally from the rack bar 48ª. This pin is so positioned on the rack bar that at the end of the forward movement thereof, that is to say, at the end of the spring winding operation, the pin engages with the forward lug 86 thus drawing the latter forwardly and with it the trip member 84 to swing the control disk 78 and thus release the escapement mechanism.

Figure 5:
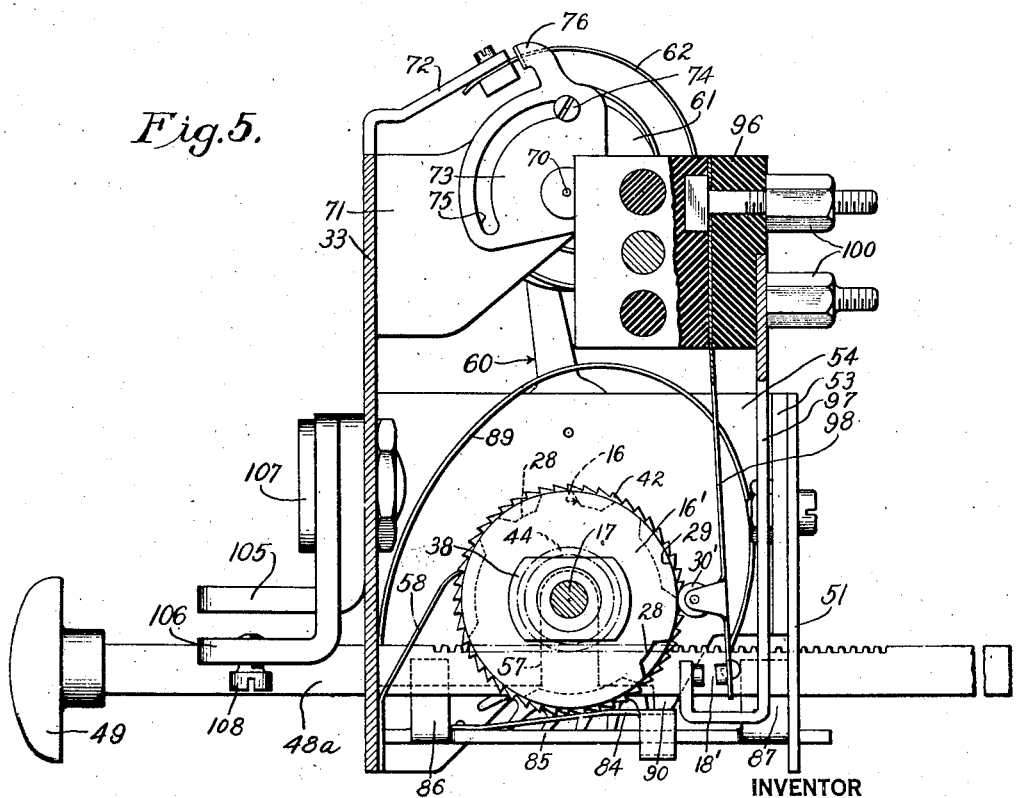
Fig. 5 is a vertical sectional view on an enlarged scale taken approximately in the plane of line 5—5 of Fig. 3.

In the forward movement of the rack bar 48ª, a spring 89 is placed under tension so that it tends to return the rack bar to its initial position when the bar is released by the operator. Said spring 89, as best shown in Fig. 5, is anchored at one end to the lower end of the front plate 33 and at its other end to the pin 88 on the rack bar. In the rearward movement of the bar by the spring, the pin 88 engages with the rearward lug 87 on the bar 85 and thus tends to restore the bar 85 and its trip member 84 to initial position in which event the winding mechanism would be rendered operable. In order, however, to prevent the operator from rewinding the spring until after the signal has been transmitted, that is, when the escapement wheel has completed one revolution, means is provided to latch the bar 85 in its foremost position, automatically releasing the same for movement to its normal rearward position at the end of the cycle. In this connection it will be observed (compare Figs. 11 and 13) that the single tooth ratchet mechanism is ineffective to wind the spring until the ratchet disk 45 has rotated reversely through one complete revolution after having rotated the ratchet disk 42 through one revolution.

Said means for latching the trip bar 85 forwardly comprises the trip member 84 and a stationary latch keeper 90. In order that the trip member may function as a latch it is made of spring steel, with its rear end yieldably held raised from the bar 85 to the limit of a stop flange 91 (Fig. 9) formed integral with the trip member and adapted to engage the under side of the bar. The keeper 90 is formed integral with the intermediate frame plate 54, being so positioned that when the bar 85 is moved forwardly at the end of the spring winding operation, the yieldable trip member moves into engagement with the keeper 90 thereby holding the lug 87 forwardly as shown in Fig. 7. Accordingly when the rack bar 48ª is released by the operator to the action of the spring 89, the pin 88 engages with the lug 87 (Fig. 13) in which position the tooth 46 of the ratchet disk 45 has not moved far enough to enter the notch 47 in the ratchet wheel. As a result, the bar 48ª in its forward movement is inoperative to place tension upon the spring.

To render the spring winding means operable after a full revolution of the escapement mechanism and hence of the sending disks 16 and 16′, the trip member 84 is disengaged from its keeper 90 by means acting at the end of the operating cycle. This means includes the offset lug 82 on the control disk 78, the lug being constructed so as to engage with the trip member rearwardly of the notch 83 therein, camming the trip member downwardly out of engagement with the keeper lug 90 and thus permitting the bar 85 to move rearwardly under the action of the spring 89, acting through the rack bar and pin 88. Thus the parts are automatically restored to the position shown in Figs. 6, 10 and 11, in condition for the next operating cycle.

Figure 14:
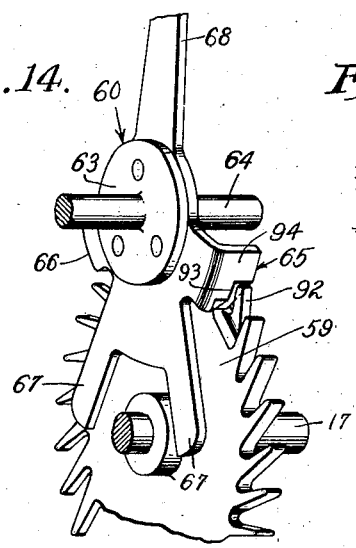
Fig. 14 is a fragmentary perspective view showing the construction of the escapement pallet with which the toothed escapement wheel coacts, whereby the initial tension of the driving spring is operative to start the device from a normal rest position.

Referring now to Fig. 14, the escapement mechanism is constructed as set forth in said Colman application Serial No. 175,377, so as to permit the driving spring 40 to start the shaft 17 moving from a normal rest position, and thus overcome the inherent tendency of an escapement mechanism of this type to remain at rest after it has been stopped. The construction referred to comprises a tooth 92 of the escapement wheel and an inclined surface 93 on the escapement dog 65, the tooth 92 being always in engagement with the pallet dog 65 when the stop arm 81 engages with the dog 66 (Fig. 6). As clearly shown in Fig. 14, the tooth 92 is made substantially narrower than the remaining teeth of the escapement wheel and is adapted to engage with the inclined surface 93 which is of corresponding width, while all of the other teeth will engage with arcuate surfaces 94 of the pallet dogs. Thus in the stopped position of the escapement mechanism the tooth 92 is forced against the surface 93 by the action of the driving spring 40, the line of action of the force applied to the pallet through the medium of the tooth 92 being eccentrically of the pallet axis and therefore such as to oscillate the pallet. In this connection it will be understood that this force is exerted by the driving spring 40 which is under a predetermined minimum tension when the escapement wheel is stopped at the end of a signal cycle.

Figure 2:
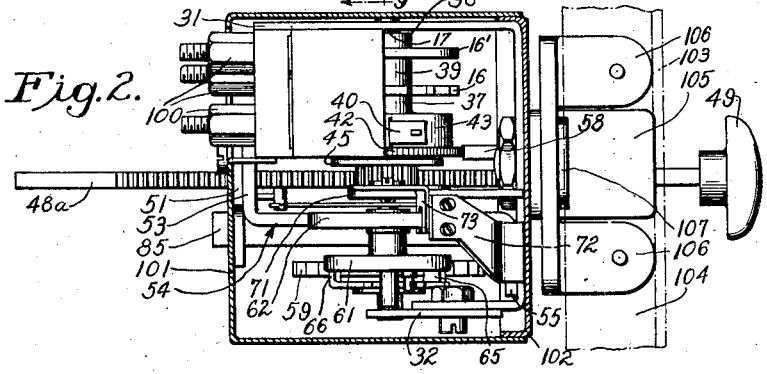
Fig. 2 is a plan view of the device, the casing here too being shown in section.

The two sets of switch contacts 18 and 18′, respectively controlled by the disks 16 and 16′, are disposed rearwardly in the frame as shown in Fig. 5. The movable contact of the set 18 is carried by a vertically disposed spring arm 95 carrying the follower 30 and having its upper end secured in a sectional block 96 of insulation material and secured to the upper end of the side plate 31 (Fig. 2). The stationary contact is carried by a relatively rigid arm 97, the lower end of which is U-shaped in form as shown clearly in Fig. 5. Similarly the stationary and movable contacts of the set 18′ are respectively carried by a spring arm 98 and the relatively stationary arm 97. The several contacts are provided with suitable terminals 100.

If desired the transmitter may be enclosed within a suitable casing comprising a main section 101 (Figs. 1 and 2) and a cap section 102, the two parts being suitably cut away to receive projecting portions such as the rack bar 48ª and terminals 100.

Figure 3:
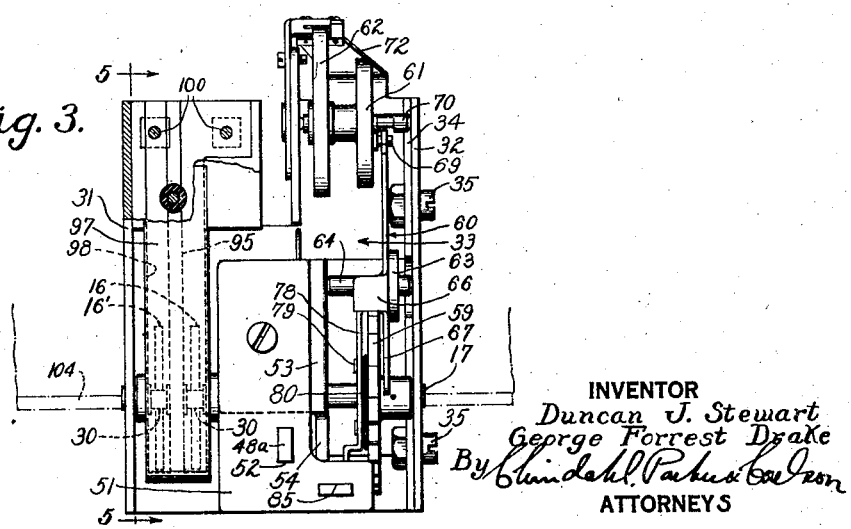
Fig. 3 is a rear side elevation of the device with a part broken away to show a detail of construction.
Figure 4:
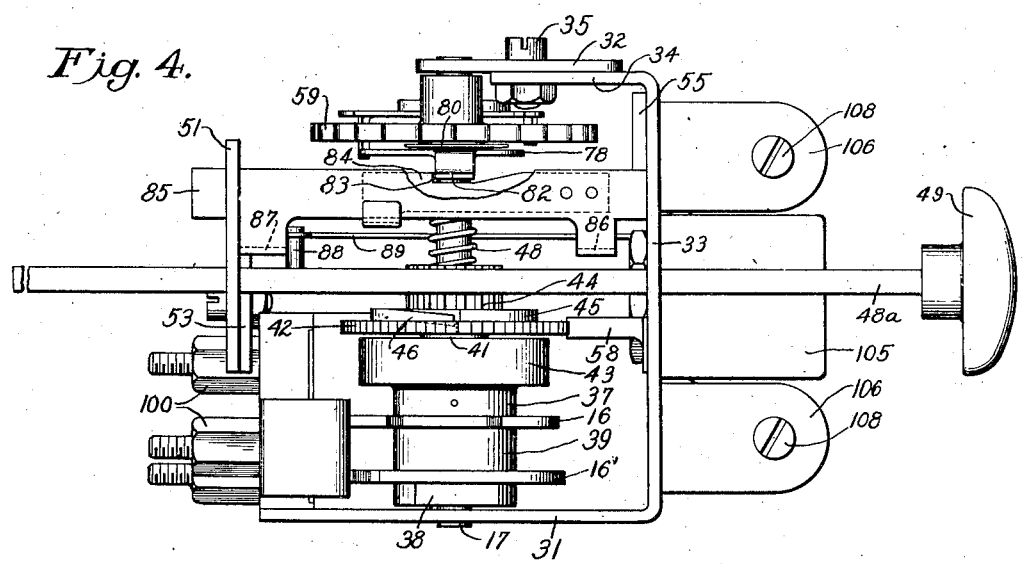
Fig. 4 is an underside plan view also having a part broken away to show a structural detail.

In practice, where the transmitter is used on a motor vehicle, it is preferably mounted rearwardly of the instrument board 103 shown in broken lines in Figs. 1, 2 and 3, said board being provided with the usual inturned flange 104 at its lower edge. A clamp is secured to the front wall 33 of the frame which is adapted to engage with said flange 104. Said clamp may be of any preferred character, that herein shown comprising two angular members 105 and 106, the vertical legs of which are secured to the front plate 33 of the frame by means of a bolt 107 and the horizontal legs of which are spaced part vertically to receive the horizontal flange of the instrument board. The member 106 has two horizontal legs spaced part and each provided with a set screw 108.

*The operation*

When the operator of the vehicle desires to send a codal signal, he grasps the forward end of the rack bar 48ª and draws the same toward him until the lug 86 on the trip bar 85 is moved by the pin 88 into engagement with the front plate 33 (Fig. 7). In such movement of the rack bar, the pinion 44 is rotated and through the single tooth ratchet device the spring 40 is wound, reverse rotation of the ratchet wheel 42 being prevented by the detent pawl 58. The escapement mechanism, however, is not released for operation until near the end of the forward movement of the rack bar when the bar 85 is operated and, through the trip member 84, the control disk 78 and arm 81, moved from the position shown in Fig. 6 to that shown in Fig. 7. In this tripping operation, the trip member 84 snaps into engagement with the keeper 90 and thus holds the trip bar 85 with its lug 87 in position to stop the full return movement of the rack bar by the spring 89. The tooth 46 of the ratchet disk 45 is thus prevented from entering the notch 47 in the ratchet wheel 42, the parts assuming the relation shown in Fig. 13. Near the end of the cycle the lug 82, rotating with the escapement wheel, cams the trip member 84 downwardly out of engagement with its keeper 90, thus permitting the trip member to move rearwardly beneath the keeper by the action of the return spring 89 for the rack bar and associated parts. In such movement of the trip member, the notch 83 therein becomes positioned to receive the lug 82, while the arm 81 moves into engagement with the pallet dog 66 to hold the pallet against oscillation and thus terminate the cycle.

It will be seen that by the arrangement provided, a predetermined maximum tension must be placed upon the driving spring preliminary to each operating cycle. If the operator releases the rack bar before having thus completely wound the spring, it will merely return under the action of its spring 89 to its initial position, but the ratchet wheel 42 having been given a partial rotation, the ratchet tooth 46 will be ineffective in a second operation of the rack bar, except to pick up the ratchet wheel in the position to which it has been advanced.

Also, it will be observed that after the escapement mechanism has been released at the end of the spring winding operation to initiate an operating cycle, the spring winding means is rendered ineffective until near the end of the operating cycle, by the latching of the trip member 84 to prevent the engagement of the ratchet tooth 46 with its slot 47. If the operator should hold the rack bar in its extreme forward position during the entire operating cycle, the mechanism will stop in the normal way except that the trip bar 85 will be held forwardly by the pin 88. The trip member 84 in that event will be held down by the trip lug 82, the member being released for upward movement into operative relation to the trip lug only after the member has been restored to its initial position (Fig. 6) by the complete return of the rack bar.

Thus we have provided a manually operable transmitter of a character such as to insure proper operation and to prevent the operator, by improper manipulation, from injuring or otherwise rendering the device inoperative.

We claim as our invention:

1. A signal transmitter comprising, in combination, a sending device, a driving spring for said device, an operator having a disengageable connection with said spring engageable to initiate the winding of the spring only in the initial position of the operator, means operable automatically to stop the sending device at the end of a predetermined cycle and releasably holding the same against movement, a member arranged to be moved by said operator and having a spring latch, a keeper with which said latch is engaged in such movement, said member being operable when in its latched position to prevent the return of the operator to its initial position, and means operable by said stop means to disengage the latch from the keeper at the end of the operating cycle.

2. A signal transmitter comprising, in combination, a rotary sending device, means for driving said device including a torsion spring having one end connected with the sending device, a rotatably mounted disk with which the other end of said spring is connected, means constantly operative to prevent rotation of said disk in a direction to unwind the spring, spring-winding means including a rotary element having a one-way connection with said disk effective only in one position of the disk relative to said winding element, a device for rotating said element in a direction to tension said spring, means operable by said device to initiate rotation of the sending device, and means operating to prevent return of said winding element to its initial position during the sending cycle, said sending device having means rotating therewith and operable at the end of a signal cycle to permit return of the rotary winding element to its initial position whereby to effect its re-engagement with said disk.

3. A signal transmitter comprising, in combination, a rotary sending device, means for driving said device including a torsion spring having one end connected with the sending device, a rotatably mounted disk connected to the other end of said spring, means normally holding said sending device against rotation, means constantly operative to prevent rotation of said disk in a direction to unwind the spring, spring-winding means including a rotary element having a single toothed ratchet connection with said disk, a device for rotating said element in a direction to tension said spring, means operating upon the rotation of the element through a predetermined distance to disengage said holding means for the sending device, and means operating to prevent return of said rotary winding element to its initial position during the sending cycle, said sending device having means rotating therewith and operable at the end of a signal cycle to permit return of the rotary winding element to its initial position whereby to effect re-engagement of said single toothed ratchet drive.

4. A signal transmitter comprising, in combination, a shaft having a sending device operatively associated therewith, a member fixed to said shaft, a second member loose on the shaft, a coiled spring connecting said members, a pinion also loose on the shaft and having a one-way connection with said second member, a rack bar meshing with said pinion and operable to rotate said second member whereby to tension said spring, a ratchet device constantly preventing reverse rotation of said second member, releasable means operating to hold said shaft against rotation during the spring winding operation, a slide having a lost motion connection with said rack bar and operable at a predetermined point in the movement of the latter to release said holding means, means coacting with said slide to prevent return movement of said rack bar to its initial position, and means operating at the end of a predetermined rotation of the shaft to render said rack bar holding means ineffective, said one-way connection between the pinion and said second member being effective only in the initial position of the rack bar.

5. A signal transmitter of the character set forth having a sending device, a spring for driving the same, means for normally holding the sending device against rotation by the spring including a stop member rotatable in the operation of the sending device, and means for winding said spring and actuating said stop member to release the sending device comprising a rotary element having a one-way ratchet connection with said spring, a manual operator for rotating said element, a slide operatively associated with said operator and operable at a predetermined point in the movement of the latter to actuate said stop member whereby to release the sending device, said slide having a latch member, a keeper for said latch member positioned so as to be engaged thereby as an incident to the release of the sending device and operative to prevent return movement of the slide to its initial position, and means operable at the end of a signal cycle to disengage said latch member from its keeper.

6. A signal transmitter comprising, in combination, a sending device, means for driving said device including a spring, means for tensioning said spring including a disk rotatable in one direction only relative to the shaft and operatively connected with the spring, a pinion having a one-way driving connection with the disk, a rack bar meshing with said pinion to rotate it to place a predetermined degree of tension on said spring, means including a releasable stop operating to hold the sending device against rotation during the winding of said spring, a slide having a lost motion connection with said rack bar and having an operative connection with said stop member whereby when the rack bar is moved through a predetermined distance the stop member is operated to release the sending device, and means coacting with said slide to hold the rack bar from being returned to its initial position, said stop member having a part operating to render the last mentioned holding means ineffective upon the completion of a predetermined cycle of operation of the sending device, and said one-way connection between said pinion and disk being effective only in the initial relation of the disk and pinion.

7. A signal transmitter of the character set forth having a sending device, a spring for driving said device, means normally operative to hold the sending device against rotation by the spring including a stop member rotatable in the operation of the sending device, and means for winding said spring and actuating said stop member to release the sending device comprising a pinion having a one-way ratchet connection with said spring, a reciprocatory bar having a gearing connection with said pinion, a slide having a lost motion connection with said bar and operable at a predetermined point in the movement of the latter to actuate said stop member whereby to release the sending device, said slide having a yieldable latch plate and said stop member having a part normally engaging with said plate for movement by the latter, and a keeper for said plate positioned so as to be engaged thereby as an incident to the release of the sending device and operative to prevent return movement of said bar to its initial position, said part on the stop member being operable near the end of the signal cycle to disengage said latch plate from its keeper.

8. A signal transmitter of the character set forth having a rotary sending device, a spring for actuating said device, and means for tensioning said spring comprising a manually operable bar mounted for reciprocation, a slide mounted for movement parallel to said bar and having a lost motion connection therewith, a latch plate yieldably mounted on said slide, a stationary notched keeper with which said plate is adapted to engage at the end of the spring winding operation, and means operable at the end of the rotation of said sending device to disengage said plate from its keeper, said reciprocatory bar having an operative connection with said spring effective only upon the return of said slide to its initial position, and said slide being operable in the engaged relation of the latched plate relative to its keeper to prevent such return of the bar to initial position.

9. In a signal transmitter having a rotary sending device, a spring for actuating said device, and means releasably holding the sending device against rotation by said spring; means for winding said spring and controlling the release of the sending device for rotation through a predetermined cycle comprising a manually operable member and a slide movable by said member and having a yieldable latch member normally connected with said holding means and operable to release the latter to initiate the signal cycle, a notched keeper engageable by the latch member upon the release of said holding means, and a part rotating with the sending device and operable at the end of the signal cycle to disengage said latch from its keeper.

10. A signal transmitter comprising, in combination, a rotary sending device, a driving spring for said device, means for initiating and terminating a signal cycle including a stop member mounted for rotation with and for limited rotation relative to the sending device, manually operable means including an operator having a lost motion connection with said stop member and operable to place a predetermined tension upon said spring, said operator being adapted through said lost motion connection to move said stop member near the end of the spring winding cycle whereby to initiate a signal cycle, said operator further having a disengageable connection with said spring operative to effect the connection to initiate the winding of the spring only in the initial position of the operator, and means preventing the restoration of the operator to its initial position until the termination of the signal cycle.

11. A signal transmitter comprising, in combination, a signal sending device, driving means therefor including a spring, an operator having a predetermined range of movement whereby to tension said spring, means operable near the end of such range of movement of the operator to initiate a signal sending cycle, and, escapement mechanism comprising an escape wheel rigid on the shaft of said sending device and a pallet cooperating with said escape wheel to control said sending device, said cycle initiating means including a disc mounted on the axis of said escape wheel for slight relative rotation and having an arm for engagement with said pallet to arrest motion of said sending device upon completion of the sending operation.

12. A signal transmitter comprising, in combination, a signal sending device, driving means therefor including a spring, an operator having a predetermined range of movement whereby to tension, said spring, said operator being capable of engagement for a winding operation only in the initial position thereof, latch means for preventing return of said operator to initial position, holding means associated with said sending device and operating independently of said operator, said holding means having an arresting part positioned to stop the sending device at the completion of the sending operation and releasable at the end of the winding operation to initiate a signal cycle, and a second part positioned to release said latch means substantially simultaneously with the arrest of said sending operation, and a connection between the operator and said arresting part including said second part operable to release the arresting part.

13. A signal transmitter comprising, in combination, a signal sending device, driving means therefor including a spring, an operator having a predetermined range of movement whereby to tension said spring, said operator being capable of engagement for a winding operation only in the initial position thereof, an escapement mechanism for controlling the operation of said sending device comprising an escape wheel rigid on the shaft of the sending device and a pallet, a disc mounted on said escape wheel for slight relative movement and being yieldably urged in a counter-rotating direction, said disc having an arm positioned to engage the pallet to arrest the sending operation at the completion thereof and to hold the sending device inoperative during the winding operation, a trip member having a lost-motion connection with said operator and engaging the disc in the holding position thereof to release the sending device upon completion of the winding operation, and a keeper positioned in the return path of the trip member to prevent return of the operator to initial position during the sending operation, said disc being in turn operable near the end of the signal cycle to disengage the trip member from the keeper.

14. A signal transmitter comprising, in combination, a sending device, a spring for driving said device having one end operatively connected thereto, means for tensioning said spring including a driven disc connected to the other end of said spring, a pinion having a second or driving disc secured thereto, said discs being coaxially arranged and one of them having a single tooth projecting from the face thereof and the other having a shoulder to be engaged by said tooth in the normal relation of the disks, a rack bar meshing with said pinion to rotate it, spring means urging said discs into engagement, means operable to hold the driven disc against reverse rotation, and means operable after the tensioning stroke of said rack bar to hold said driving disc out of normal relation until completion of the sending operation.

In testimony whereof we have hereunto affixed our signatures.

DUNCAN J. STEWART.
GEORGE FORREST DRAKE.